United States Patent [19]

Daniel

[11] Patent Number: 4,523,458
[45] Date of Patent: Jun. 18, 1985

[54] INJECTOR TESTER

[75] Inventor: Kelvin J. Daniel, Gladesville, Australia

[73] Assignee: Keldan Industries Limited, New South Wales, Australia

[21] Appl. No.: 522,167

[22] PCT Filed: Nov. 22, 1982

[86] PCT No.: PCT/AU82/00192

§ 371 Date: Jul. 25, 1983

§ 102(e) Date: Jul. 25, 1983

[87] PCT Pub. No.: WO83/01814

PCT Pub. Date: May 26, 1983

[30] Foreign Application Priority Data

Nov. 26, 1981 [AU] Australia .............................. PF/1712
Nov. 26, 1981 [AU] Australia .............................. PF/1713

[51] Int. Cl.³ .......................................... G01M 15/00
[52] U.S. Cl. .................... 73/119 A; 310/336
[58] Field of Search ............ 73/119 A, 660; 310/336, 310/340

[56] References Cited

U.S. PATENT DOCUMENTS 4,102,181 7/1978 Cser et al. ........................... 73/119 A
4,109,517 8/1978 Dyballa et al. ................... 73/119 A

FOREIGN PATENT DOCUMENTS 110559 9/1981 Japan ............................... 73/119 A Primary Examiner—Jerry W. Myracle
Attorney, Agent, or Firm—Ladas & Parry

[57] ABSTRACT

A device for testing fuel injectors in situ. The device comprises a detector (10) having a piezoelectric crystal (50) which converts mechanical impulses caused by the fuel injector valve needle snapping back onto its seat onto electrical signals. The signals are fed to electronic processing means (15) which detects the signal amplitude and displays it on an LED bar graph display (2) as an indication of the operating efficiency of the fuel injector. A timing system using the detector (10) as a generator of timing signals is also disclosed.

8 Claims, 7 Drawing Figures

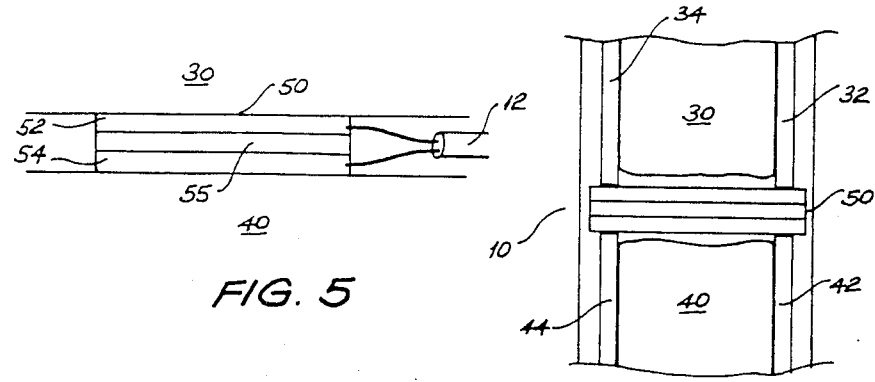
FIG. 5
FIG. 6
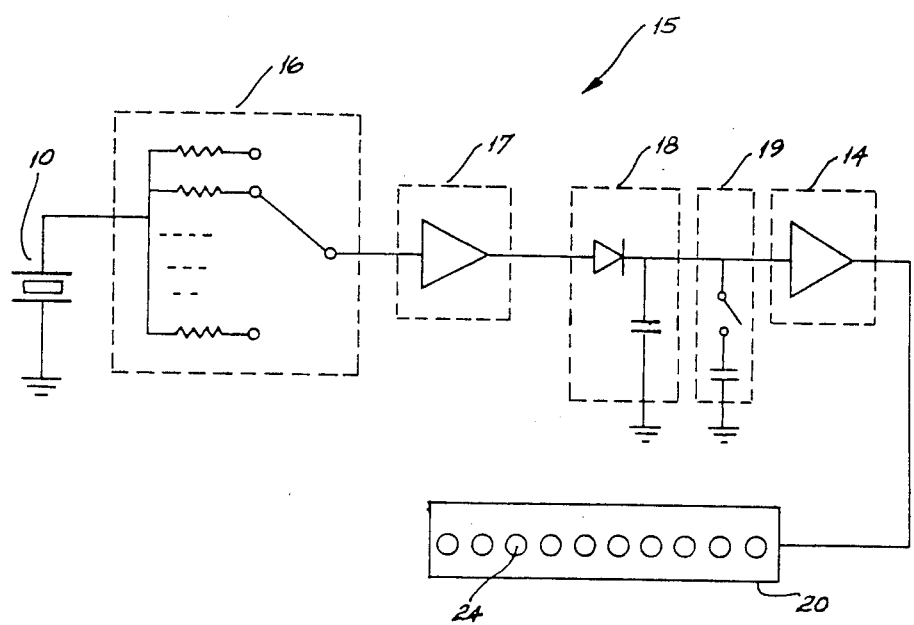
FIG. 7

INJECTOR TESTER

The present invention relates to a device for testing fuel injectors such as those used in diesel engines. The invention also relates to a timing system for fuel injected engines.

BACKGROUND ART

Fuel injectors with atomizer nozzles have between 4 and 7 small holes in the nozzle, approximately 0.2 mm in diameter. In use, these holes are frequently reduced in size, or blocked entirely, causing an imbalance in the spray pattern of atomized fuel into the cylinder and a consequent imbalance in the air-fuel ratio, resulting in incomplete combustion.

This incomplete combustion manifests itself in power loss and black smoke emission from the exhaust. Continued operation of an engine under such conditions results in irrepairable damage to the injector, the piston and the cylinder head, in that sequence.

A faulty injector still in the engine can only be detected when it has failed completely. The engine is run at idle and each injector fuel supply connection is eased, in turn, until fuel leaks out. Under this condition, the injector will fail to operate. If, when the nut is eased, the idle speed is markedly affected then that injector is operating properly. Conversely, easing the nut on a faulty injector has no affect on the idle speed. This known method of testing fuel injectors is a time consuming inefficient method.

The applicant knows of no means of reliably detecting faulty injectors before failure thereof. The most widely practiced method of dealing with the problem is to remove and replace all injectors at specified service intervals. Another common detection method for a faulty injector is the "black smoke" test (a vehicle expelling 10 seconds or more of black smoke detected against the sky line). A loss of power under load is also an indication of fuel injection problems.

DISCLOSURE OF INVENTION

It is an object of the present invention to overcome or substantially ameliorate the above described problem by providing apparatus for testing the fuel injectors in situ for faulty operation.

It is another objection of the present invention to provide a timing system for a fuel injected engine.

According to one aspect of the present invention, there is disclosed apparatus for testing a fuel injector, said apparatus comprising transducer means adapted to be placed on or near said fuel injector to convert mechanical impulses to electrical signals, electronic processing means connected to the output of said transducer means and comprising an amplitude detecting circuit for detecting the amplitude of the received electrical signals, and display means connected to the output of said amplitude detecting circuit for providing a display proportional to the detected amplitude.

Preferably, the transducer comprises a detector having a piezo-electric crystal sandwiched between two magnets, the detector being magnetically attachable to the fuel injector.

Preferably, the display means comprises a bar graph display comprised of a series of light emitting diodes.

According to another aspect of the present invention, there is provided a timing system for a fuel injected engine, said timing system comprising transducer means adapted to be placed on or near a fuel injector in said engine to convert mechanical impulses to electrical signals, and timing signal generating means connected to the output of said transducer means for generating time signals in response to the output signals from the transducer means.

The transducer means used in the fuel injector testor can also be used as part of the timing system. The mechanical impulse generated when the fuel injector valve needle snaps back onto its seat is detected by the transducer means and an electrical signal is generated. Thus, the electrical signals received from the transducer means indicate the precise instants of time when the injector injects fuel into the combustion chamber, and the output signals can be used to operate a timing system such as an engine speed tachometer or a strobe light for checking timing. Consequently, a fuel injected engine, such as a diesel engine, can be strobe light timed onto the fly wheel timing marks in the same fashion and with the same ease as an electric ignition engine. Accurate and dynamic tuning of the diesel engine can thereby be obtained.

BRIEF DESCRIPTION OF DRAWINGS

A preferred embodiment of the present invention will now be described with reference to the drawings in which:

FIG. 5 is an enlarged cross-sectional elevational view of the piezo-electric crystal of the detector of FIG. 1.

FIG. 6 is an enlarged cross-sectional end elevational view of the piezo-electric crystal of the detector of FIG. 1.

FIG. 7 is a schematic block diagram of the circuitry of the injector tester of FIG. 1.

BEST MODE OF CARRYING OUT THE INVENTION

Figure 1:
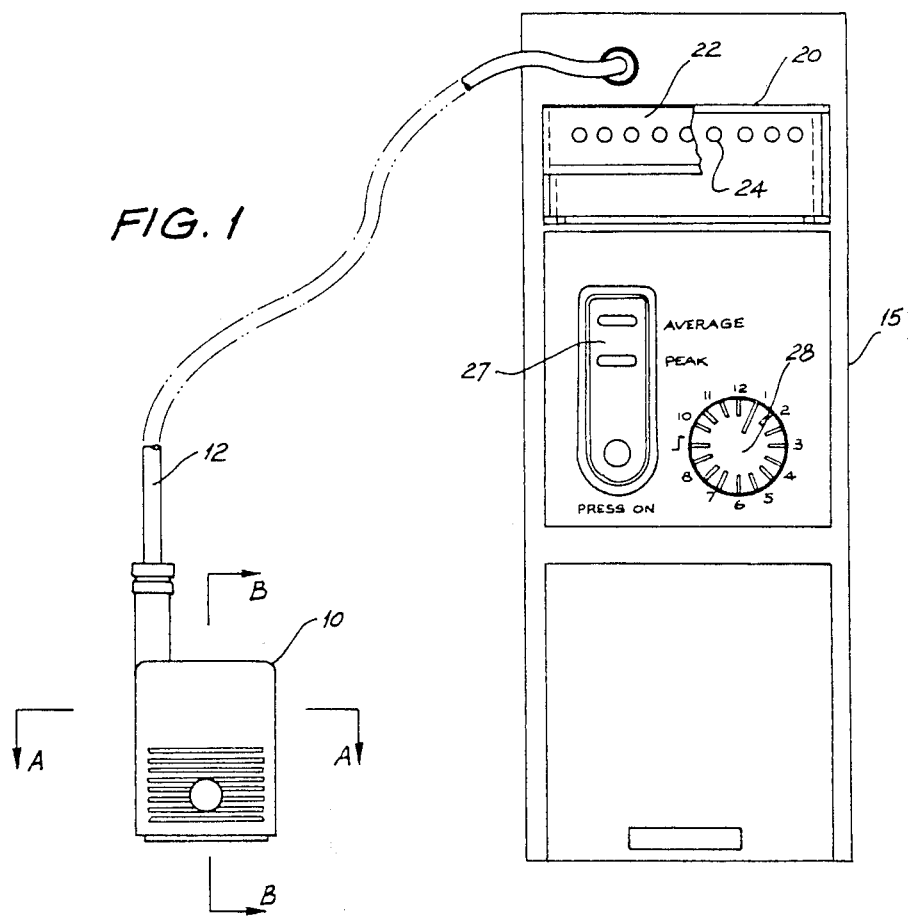
FIG. 1 is an elevational view of the injector testor of the preferred embodiment.
Figure 2:
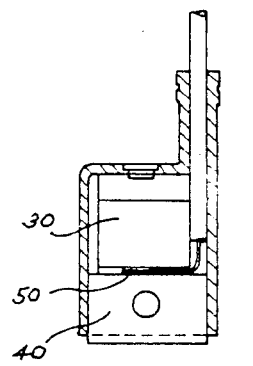
FIG. 2 is a cross-sectional elevational view taken along C—C (FIG. 3) of the detector of FIG. 1.
Figure 3:
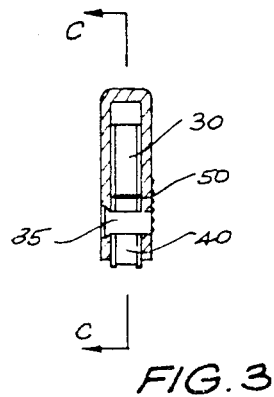
FIG. 3 is a cross-sectional end elevation view taken along B—B of the detector of FIG. 1.
Figure 4:
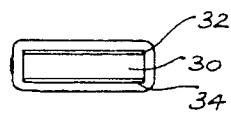
FIG. 4 is a cross-sectional plan view taken along A—A of the detector of FIG. 1.

As illustrated in the drawings, the injector tester of the preferred embodiment comprises a detector which is a passive device incorporating a ferro-magnetic clamp for attaching the detector directly to the injector body with sufficient strength to sustain the attachment while the engine is running.

The detector uses a transducer which comrpises a bilaminar piezo-electric crystal 50 sandwiched between two magnets 30, 40. The piezo-electric crystal actually comprises two piezo-electric substrates 52, 54 with a metal layer 55 sandwiched therebetween. Wires connected to the two substrates 52, 54 lead to the electric processing means 15 for processing the signals received from the detector.

As illustrated in FIG. 6, the magnets 30, 40 are provided with end plates 32, 34 and 42, 44. The piezo-electric crystal 50 is held between the end plates 32, 34 and 42, 44 so that mechanical vibrations of the end plates are transmitted directly to the crystal where they are converted to electric signals. A rivet 35 is inserted through the bottom magnet 40 into the detector body to prevent the piezo-electric crystal from being crushed between the two magnets by excessive shock. In this manner, although vibrations are sensed by the piezo-electric crystal, it is protected from excessive shock. The crystal/magnet assembly is coated with epoxy to form a sealed unit and housed in a plastic jacket.

Due to the above described mounting arrangement, the piezo-electric crystal is frequency selective. For example, the low frequency component of the engine vibrating in its mounts falls below the detector's range, and other unwanted noises and vibrations generated by the engine and its components are filtered by the mounting arrangement so that the detector is primarily responsive only to the particular band of frequencies within which the vibrations of the injector needle/nozzle assembly fall. If necessary however, a frequency window can be incorporated into the electronic processing means to filter out unwanted vibrations.

The electronic processing means of the preferred embodiment is a pulse height analyser circuit and is schematically shown in FIG. 7. The output of the detector 10 is fed to an amplitude range selector 16 which can be a multiple resistance switch which is adjusted to a desired setting so that the detected amplitude falls within the range of the display means 20. The output from the amplitude range selector 16 is amplified in pre-amplifier 17 and then fed to a peak detector 18. A "clamp and hold" circuit can also be incorporated to extend the duration of the recorded pulse so that the peak value can be analysed by an analogue level detector, if desired. If average, rather than peak, value is desired, an average select switch 19 can be enabled to provide an average reading of the detected pulse.

The peak or average value of the detected pulse is fed via buffer amplifier 14 to a display 20 which comprises a display driver (not shown) which drives a series of light emitting diodes 24. Thus, the instantaneous vibration level caused by the reseating injector needle is translated into a scaled visual display. The short firing time of the injector is extended so that the operator can see and interpret the information being displayed.

In operation, the detector is placed on an injector which is known to be operating properly, or if no injector is known to be operating properly, it is placed on the injector giving the highest reading on the visual display 20. The amplitude range select switch 16 is set so that the pulses received from the chosen injector light up substantially all of the diodes in the bar graph display 20. With the amplitude range selector on the same setting, the detector is then placed on an injector suspected of malfunctioning and the number of light emitting diodes which are illuminated by the suspected injector will provide an indication of its condition. A properly operating injector will light up substantially all of the diodes, whereas a faulty injector will illuminate fewer diodes.

The pulse height analyser circuit is fabricated in CMOS intergrated circuits and a high input impedance ensures limited protection against electrical interference. Power is supplied from a standard 9 volt dry cell battery contained within the processor package, and the processor will function accurately so long as there is sufficient power to operation the LED display.

Other than the on/off switch, there are only two controls required to be operated; the amplitude range select switch 28 and the peak/average switch 27. The amplitude select switch adjusts the amplitude of the received pulse so that the displayed value falls within the range of the bar graph display. This switch is incorporated to compensate for different pulse heights from different engines since the pulse height is affected by the speed of the engine, the engine block mass/injector body mass ratio, injector needle valve/nozzle mass ratio, the number of nozzle holes or the shape of the pintle nozzle, and the damping response of the needle return spring. These factors do not have to be considered separately since the optimum range setting can be quickly determined simply by adjusting the peak level in the display to just below full scale.

The peak/average selects a fast or slow decaying display, in order to visually highlight any fault. The "average" position reveals constant, injector faults over a number of engine cycles and exposes the most common injector faults such as clogged or carbonized tips, defective valve seating, stuck valve stem, eroded valve stem and incorrect spring tension. Other intermittent faults are detected with a display which shows the "peak" level on each injector stroke. Thus, the "peak" position allows the display to reveal any fluctuations due to partly sticking valve stem, contaminated fuel, loose debris within the injector body or cracked or sticking valve spring.

Not only will the device test injectors, but it can also be used to detect bearing knock in motors.

A further use of the present invention is in a timing system for a fuel injected engine. At present, there are no simple timing systems for fuel injected engines. However, a simple timing system can be constructed using the detector 10 of the present invention. In this further application of the invention, the detector 10 is attached to an injector in the engine, and the output electrical pulses from the detector 10 can be used to drive a timing signal generator.

In one embodiment, the detector 10 is suitably clamped to the number one cylinder outlet high pressure fuel line which connects the number one fuel pump outlet to the number one cylinder injector unit in the engine. The piezo-electric transducer in the detector 10 senses the pressure wave which causes the injector to fire. Again, the detector can be made to be frequency selective so that the engine's background noise is blanked out, and the output will be proportional to the frequency of firing of the particular injector unit. The output can be used to actuate a strobe light unit, a tachometer or an engine diagnostic system.

The foregoing describes only two embodiments of the present invention, and modifications which are obvious to those skilled in the art may be made thereto without departing from the scope of the invention as defined in the following claims.

I claim:

1. Apparatus for testing a fuel injector, said apparatus comprising a transducer adapted to be placed on said fuel injector to convert mechanical impulses to electrical signals, electronic processing means connected to the output of said transducer and comprising an amplitude detecting circuit for detecting the amplitude of the received electrical signals, and display means connected to the output of said amplitude detecting circuit providing a display proportional to the detected amplitude, wherein the transducer comprises a piezo-electric crystal sandwiched between two magnetic members.

2. Apparatus as claimed in claim 1, wherein said magnetic members are held between rigid plate members bearing on said piezo-electric crystal, one end of at least one plate member adapted to be in physical contact with said injector whereby vibration in said injection are transmitted by said at least one plate member to said crystal.

3. Apparatus as claimed in claim 2, wherein the display means comprises a bar graph display having a series of light emitting diodes.

4. Apparatus as claimed in claim 2, wherein said electronic processing means comprises an amplitude range selector for varying the amplitude of the signal received from the detector.

5. Apparatus as claimed in claim 2, wherein the piezo-electric crystal comprises two piezo-electric substrates with a metal layer therebetween.

6. A timing system for a fuel injected engine, said timing system comprising a transducer adapted to be placed on a fuel injector or fuel line in said engine to convert mechanical impulses to electrical signals, and timing signal generating means connected to the output of said transducer for generating timing signals in response to the output signal from the transducer, wherein the transducer comprises a piezo-electric crystal sandwiched between two magnetic members.

7. A timing system as claimed in claim 6, wherein the transducer comprises a detector having a piezo-electric crystal sandwiched between two magnetic members, said detector being attachable to a fuel injector and adapted to provide electrical pulses at a frequency proportional to the rate of firing of the fuel injector.

8. A timing system as claimed in claim 7, wherein the timing signal generating means comprises a strobe light or a tachometer.

* * * * *